Nov. 18, 1969  R. N. DAVIS  3,479,120
APPARATUS FOR DUPLICATING REELABLE FILM
Filed Oct. 5, 1964  4 Sheets-Sheet 1

INVENTOR.
RONALD N. DAVIS
BY
LeRoy J. Leishman
AGENT

INVENTOR.
RONALD N. DAVIS
BY
AGENT

United States Patent Office
3,479,120
Patented Nov. 18, 1969

3,479,120
APPARATUS FOR DUPLICATING REELABLE FILM
Ronald N. Davis, Bethesda, Md., assignor, by mesne assignments, to Columbia Broadcasting System, Inc., New York, N.Y., a corporation of New York
Filed Oct. 5, 1964, Ser. No. 401,399
The portion of the term of the patent subsequent to Nov. 18, 1985, has been disclaimed
Int. Cl. G03b 27/04, 27/22
U.S. Cl. 355—85                    13 Claims

ABSTRACT OF THE DISCLOSURE

A photographic duplicating machine in which an original film and duplicating film are supplied in superimposed relationship to the periphery of a printing drum. A plurality of light sources are arranged together with lens system or parabolic reflectors for directing the light rays from the sources in a non-parallel beam that is substantially radial to the drum at locations where the rays impinge on the original film. An optical system is also disclosed for directing light radially outwardly with respect to the surface of the drum when the light source is located within the drum.

---

The invention herein described pertains to equipment for duplicating film, and more particularly to motion picture or microfilm duplicating apparatus that may be used in a lighted room. The invention is directed primarily to improvements in the apparatus set forth in my co-pending application No. 155,085, filed Nov. 27, 1961, now U.S. Patent No. 3,160,086, issued Dec. 8, 1964.

The said co-pending application disclosed means for keeping the original film in tight intimate contact with the duplicating film on the duplicating drum, this means including provisions for driving the drum and the film without the necessity of relying upon sprocket holes for engagement with the teeth of sprocket wheels for driving the film. The present invention supplies additional means for keeping the original film and duplicating film in tight engagement around the duplicating drum, and it provides additional instrumentalities for driving the film, particularly where it leaves the drum.

In prior art equipment antedating that disclosed by applicant in the aforementioned pending application, light rays directed against an original film superimposed over a duplicating film on a capstan, tended to spread out sideways with the result that while the control rays passed through the two films perpendicularly to the periphery of the drum or capstan, others passed through them in other directions. As a consequence, some of the rays bearing a portion of the image on the original film did not pass through the sensitized portion of the duplicating film in lines that extended perpendicularly to the surface of the films.

This spreading out of the rays on both sides of a central beam in the older prior devices tended to blur the duplicated image. The aforementioned co-pending application disclosed means for reducing this divergence of the beams and for constraining them optically into parallel rays. The present invention carries this idea still further by so converging the rays that they are substantially perpendicular to the surface of the drum or capstan at all points within the beam—that is, so that they will become radial with respect to the drum and in effect pass through the rotational center thereof.

In accordance with these general objectives, one specific object of the present invention is to provide improved means for keeping the original film and duplicating film in tight contact around the periphery of the duplicating drum.

An additional object is to provide improved driving means for the film.

A further object is to provide optical systems for use in apparatus of the type described that will direct the light toward the film in lines that are radial with respect to the drum.

Yet another object is to provide dichroic filtering means in connection with the optical systems to reduce the amount of unwanted rays that reach the film and to conserve primarily the rays near the ultraviolet end of the visible spectrum that are the most effective in producing optical images on diazo film.

This invention possesses many other advantages, and has other objects which may be made more clearly apparent from a consideration of illustrative embodiments of the invention. For this purpose, alternative forms have been shown in the drawings accompanying and forming a part of the present specification, but it is to be understood that this detailed description is not to be taken in a limiting sense, since the scope of this invention is best defined by the appended claims.

Referring to the drawings.

Figure 1:
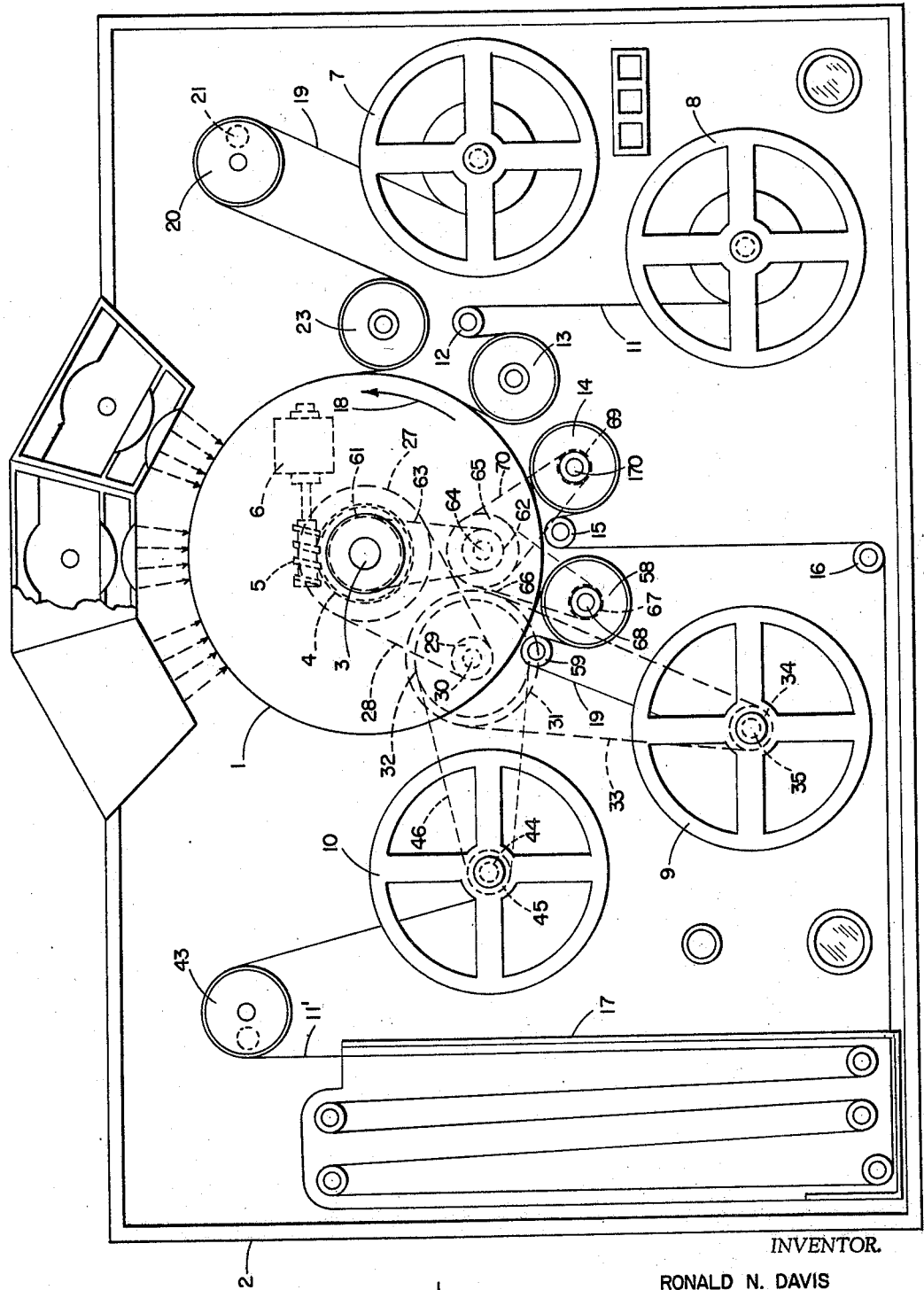
FIGURE 1 is a front elevation of the presently preferred embodiment of the invention in which the principal components are mounted on the front of a panel and the various driving means on the reverse side.

In the presently preferred embodiment of the instant invention as well as in the apparatus disclosed in the aforementioned co-pending application, a drum or capstan 1 is rotatably supported upon a vertical panel or support 2. The drum 1 is keyed against relative rotation on the driveshaft 3 which passes through the support 2. On the reverse side of this support, as shown in phantom, a worm gear 4 is also mounted against relative rotation on the driveshaft 3. A worm 5, meshing with the worm gear 4, is affixed to the shaft of, or appropriately driven by, a motor 6.

Clustered around the drum 1, but spaced therefrom in order to permit the interposition of other parts, are four reels. As in my co-pending application, reel 7 is a rotation-resisting supply reel for the original or master film; reel 8 is a similar rotation-resisting supply reel for the "raw" duplicating film; reel 9 is a wind-up reel for the original film; and reel 10 is a similar wind-up reel for the developed duplicating film. The means for driving the wind-up reels will be explained after the particular requirements which they must meet have become apparent.

As the duplicating film 11 leaves the rotation-retarding reel 8, it passes counterclockwise around an idler roller 12 and thence clockwise around a larger feed-on wheel 13, from whence it encircles the greater part of the polished periphery of the printing drum 1. When the duplicating film leaves the periphery of this drum, it partially encircles a first driven stripping wheel 14, proceeding there-around in a clockwise direction, and it then traverses a portion of the periphery of the idler roller 15 in a counterclockwise direction. Appropriate means for driving the stripping wheel 14 will be described hereinafter when other driving means are explained.

If the parts are oriented as illustrated in FIG. 1, the film upon leaving the idler roller 15 extends downwardly and around still another idler roller 16 as it proceeds to the developing chamber 17.

If the film 11 grips the periphery of drum 1 as the drum rotates in the direction indicated by arrow 18, the film will of course be taut around the feed-on wheel 13 and the stripping wheel 14 and as far back as the point where it leaves the supply reel 8, which is appropriately loaded against any rotation except that imparted to it by the motion of the film itself. The film 11 will grip the periphery of drum 1 providing the film is taut as it leaves the drum as well as when it first contacts the periphery of the drum upon leaving the feed-on wheel 13.

Although the wind-up reel 10 for the duplicating reel is driven, by means later to be explained, the stripping wheel 14 is also driven as an additional assurance that the film will be taut all around the drum. The feed-on roller 13 and the idler roller 12 of course exert a snubbing action that helps to keep the film taut as it approaches the drum after leaving the supply reel 8 which, as previously mentioned, is appropriately equipped with rotation-resisting means to prevent the film from moving excepting as it is pulled around the drum. After leaving the developing compartment 17, the developed film 11' proceeds around an idler inspection pulley 43, the function of which is explained in my aforementioned co-pending application, and it is then reeled up on reel 10 which is appropriately driven by means hereinafter to be explained.

As the original film 19 leaves the rotation-resisting reel 7, it passes around the inspection drum 20, which has a transparent cylindrical wall. The inspection drum is illuminated from within by an appropriate light source 21. The light rays from this source pass through the transparent cylindrical walls of the drum and thence through the original film 19. As it proceeds around the inspection drum's periphery the speed of transport is usually sufficiently slow to permit such inspection as may be desired.

After the film leaves the inspection drum, it passes around a feed-on wheel 23 which lays the original film on top of the duplicating film on the printing drum 1. After traversing more than two-thirds of the periphery of this drum, the orignal film is stripped off by the driven stripping wheel 58, the driving means being explained hereinafter. The original film is pulled around this stripping wheel in a clockwise direction enroute to the idler 59 around which it proceeds in a counterclockwise direction enroute to the wind-up reel 9. Inasmuch as both the stripper wheel 58 and the wind-up reel 9 are appropriately yieldingly power-driven, and since the feed-on wheel 23 and the inspection drum 20 together exert a snubbing action upon the original film as it leaves the rotation-resisting supply reel 7, it will be clear that the stripper wheel 58 and the wind-up reel will keep the original film tight against the duplicating film around the capstan 1 at all times.

Foregoing portions of this specification have mentioned the two driven wind-up reels and the two driven stripping wheels as well as the capstan itself, which is power-driven in the manner previously explained. The specific means by which the stripper wheels and wind-up reels are driven is immaterial to this invention, but FIG. 1 nevertheless shows the system that I presently prefer.

The manner in which the motor 6 drives the shaft 3 for the capstan or drum 1 has already been explained. This shaft indirectly drives the rewind reel 9 for the original film. A pulley or sprocket wheel 27 is suitably secured to the shaft 3 for rotation therewith, and the wheel 27 drives a chain or belt 28 which passes around and drives a pulley 29 as it proceeds to encircle the driving pulley 27. The small pulley 29 is secured to the shaft 30 along with a larger pulley 31. Pulley 31 drives a smaller pulley 34 which has provisions, not shown, for driving the shaft 35 by any appropriate cutching device that will permit the film being wound up on reel 9 to be kept taut without danger of breakage, it being understood of course that the reel 9 is either rigidly secured to the shaft 35 or driven thereby by an appropriate slipping clutch which may be interposed in this position in the transmission system rather than between the pulley 34 and the shaft 35.

The rewind reel 10 for the duplicated film is driven in the following described manned by the previously mentioned shaft 30. Pulley 32 is secured to shaft 30 for rotation therewith, and this pulley drives a smaller pulley 45 carried by shaft 44 which also supports the wind-up reel 10. The motion of pulley 32 is transmitted to pulley 45 by means of a suitable driving band 46. A slipping clutch arrangement is operatively interposed between the small pulley 45 and the wind-up reel 10, it being immaterial whether this clutch is located between the pulley 45 and the shaft 44 or between the shaft 44 and the wind-up reel itself.

Let us now see how the stripper wheel 58 is driven. The pulley or sprocket wheel 61 is secured to the driving shaft 3 of the drum upon which is also rigidly mounted the previously mentioned pulley 27. Pulley 61 drives a relatively small pulley 62 by means of an appropriate belt or chain 63. The small pulley 62 is rigidly secured to a shaft 64 upon which is mounted a larger pulley 65 which, by means of a suitable belt or chain 66 drives the small pulley 67 mounted on the shaft 68 which carries the stripper wheel 58. A suitable slipping clutch arrangement is interposed between the pulley 67 and the stripper wheel 58 so that the stripper wheel may take the original film 19 from the drum as fast as the rotation of the drum will permit.

The idler roller 59, operatively interposed between the driven stripper wheel 58 and the rewind wheel 9, serves not only to help keep the film taut by means of its snubbing action but also to carry the film further around the driven stripper wheel 58 in order that the film may contact a greater portion of the driving periphery of the driven wheel 58. The speed of reel 9 must of course be such that the film can be rewound as fast as it is stripped from the capstan by the stripper wheel 58.

The stripper 14 is also connected into the driving system. Behind the previously mentioned pulley 65, another pulley of the same diameter is also rigidly secured to the shaft 64 for driving a band or chain 70 which in turn drives the smaller pulley 69. The small pulley 69 and the larger stripper wheel 14 for the duplicating film, are both mounted upon the shaft 170, there being an appropriate slipping clutch arrangement interposed between the pulley 69 and the stripper 14. Unless there is slippage between both of these last mentioned rotary members and the shaft 170, either the pulley 69 or the stripper 14 must be secured to this shaft.

As previously mentioned, the traction of the stripper wheel 14 on the duplicating film as it leaves the capstan keeps the duplicating film taut against the retarding action of the duplicating supply reel 8, and the rewind reel 10 is of course driven through its associated slipping clutch at such speed that the duplicating film will be kept taut all the way from the stripper wheel 14 through the developing chamber 17 and over the inspection drum 43 as it proceeds toward and around the windup reel 10.

As the duplicating and original films move in superimposition around the periphery of the capstan 1, light rays from one or more sources are directed onto the original film. The light source or sources may be arranged substantially as shown in FIG. 1. In this embodiment, for reasons hereinafter explained, the periphery of the capstan or drum 1 is preferably polished.

Figure 4:
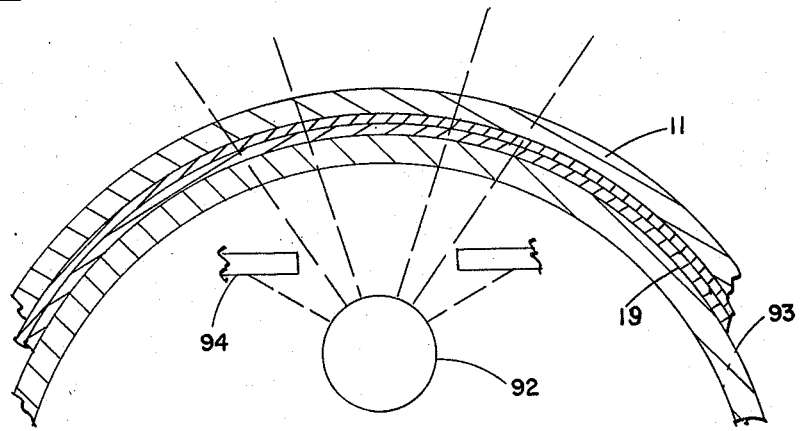
FIG. 4 shows a prior art arrangement in which the light source is inside a drum having a transparent periphery, and utilizing a mask for intercepting the rays that diverge most widely from the central beam.
Figure 6:
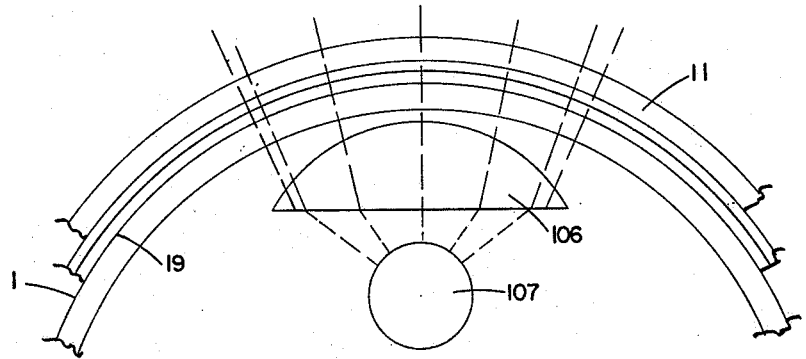
FIG. 6 is an alternative arrangement for directing the rays into radial lines, the light source and optical system in this modification being inside the drum.

If the films are reversed in position, with duplicating film superimposed over the original film, the peripheral wall of the drum must be transparent and the light source or sources must of course be on the inside of the drum, as shown in the prior art device of FIG. 4 and in the improved arrangement of FIG. 6, the latter being another embodiment of the instant invention.

One of the chief improvements of this invention over that described in the aforementioned pending application is in the provision of means for directing the light rays to the two films in lines that are radial with respect to the drum. In the prior art arrangements illustrated in FIGS. 2, 3 and 4, the rays spread out and thus create an undesirable condition that reduces the definition of the duplicated film as compared with the original. This is illustrated in FIGS. 2 and 3.

Figure 2:
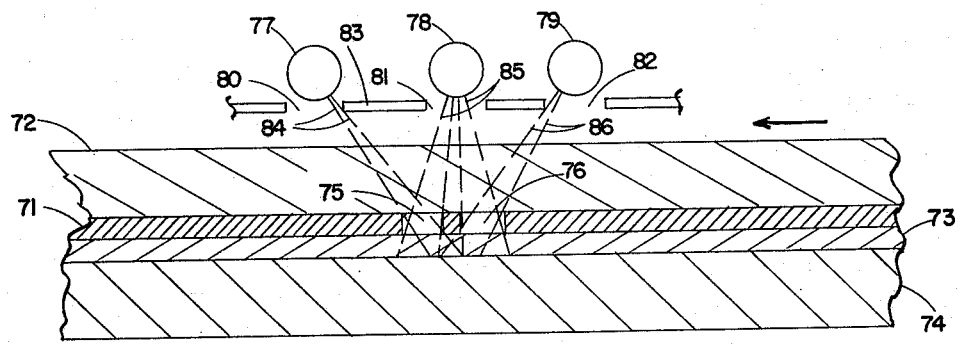
FIG. 2 is a diagram showing how the light from various external positions with respect to the film passes therethrough at many angles in prior art devices, this illustration showing greatly enlarged sections of the films superimposed over each other and lying flat.
Figure 3:
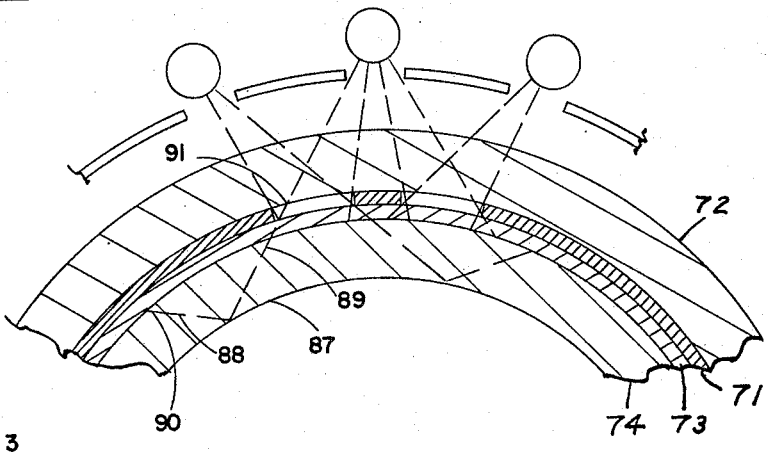
FIG. 3 is a diagram similar to that of FIG. 2 but showing the greater difficulties that arise when the film is disposed arcuately, as when passing over the periphery of a printing drum.

In FIG. 2, the silver or original image area 71, formed on the base of original film 72, is shown in contact with the emulsion layer 73 of the duplicating film 4. Areas 75 and 76 represent specific image areas of the original film. Assuming the elements 77, 78 and 79 to be individual light sources, some of whose rays pass through apertures 80, 81 and 82 in the mask 83, it will be seen that the rays passing through the areas 75 and 76 from the different sources fall in respectively different but overlapping regions of the emulsion layer 73 of the duplicating film 74. This obviously causes blurring.

If elements 77, 78 and 79 are assumed to be a single light source in three different relative positions with respect to the moving films, the rays 84 will represent the rays that pass from the light source through area 75 as the overlapping films approach; the rays 85 represent a group of rays spreading out over the films as they pass under the source when it is in the relative position 78 with respect to the films; and the rays 86 represent those that proceed through the area 76 as this area leaves the region of the light source. This condition, bad enough when the film is moving in a straight line, is aggravated when the film is curved around a capstan having a polished periphery 87. In this case, not only do the rays spread out as indicated in FIG. 2, but they spread over a wider region of the films (especially of the duplicating film) because more of the film is bent into the regions of the respective spreading beams. The periphery of the drum is of course polished in order that the rays may pass back through the duplicating film and thus have added actinic effect, but the reflected ray 88 effectively doubles the damage caused by the spreadout incident ray 89 because it tends to duplicate on the area 90 of the duplicating film the details of region 91 of the original.

It should be clear from these diagrams that spreading rays blur the duplicated images and decrease the resolution. This is true whenever the rays spread out, even as in such an arrangement as that shown in FIG. 4 where the effect of the spreading has been lessened by putting the light source 92 inside of the drum 93 and reducing the spread by means of a mask 94.

Despite the relative thinness of the image areas of the respective films, the conditions diagrammed in FIGS. 2 and 3 nevertheless prevail. This is especially bothersome on microfilm when it is desirable to have infinitely fine resolution up to more than 500 lines per millimeter. The edges of such fine lines obviously spread out and become fuzzy due to the conditions diagrammed in FIGS. 2 and 3. The present invention eliminates these conditions by the arrangements illustrated in FIGS. 5, 6 and 7.

Figure 5:
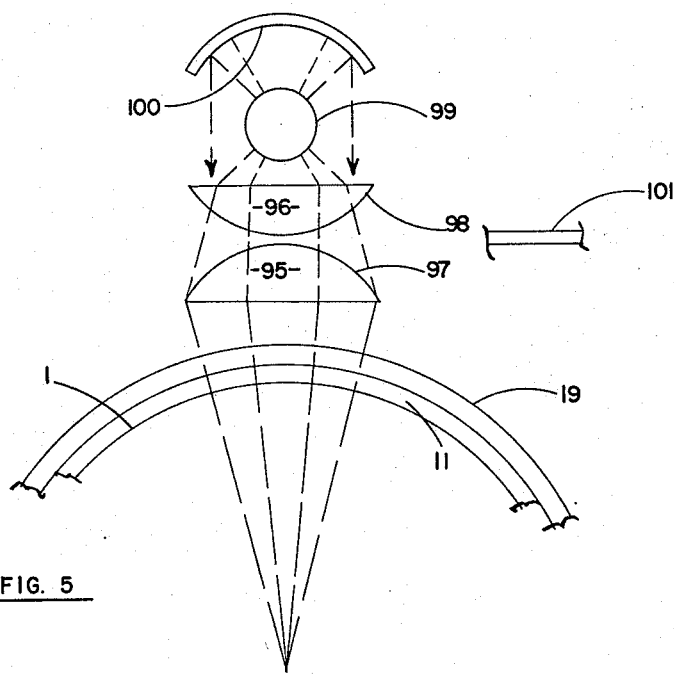
FIG. 5 is a diagram showing an improved arrangement for directing the rays from a light source external of the printing drum toward the film in a beam whose component rays converge toward, and intersect, the center of the printing drum.

The presently preferred arrangement is that illustrated in FIG. 5 wherein two plano convex lenses 95 and 96 are disposed with their convex sides 97 and 98 respectively facing each other, the two being interposed between the light source 99 and the original film 19 so that the rays are refracted into a beam whose component rays are radial with respect to the drum, that is, they converge at the center of the drum or capstan. Rays of light from the source 99 that would not normally fall upon the lens 96 may be directed toward such lens by a concave reflecting surface 100.

Inasmuch as this invention contemplates the use of film that is especially sensitive to ultraviolet light, such as diazo film, and since the rays in the region of the red and infrared portions of the spectrum produce undesirable heat, I not only prefer that the lenses be made from quartz but that a dichroic filter indicated by the element 101, be suitably interposed anywhere between the light source 99 and the film 19.

Light may of course be caused to pass through film on a transparent drum in rays that are perpendicular to the film if the light source is at the exact center of the drum. Inasmuch as the rays must always pass first through the original film and then through the duplicating film, the use of an internal light source requires that the original film be next to the periphery of the drum with the duplicating film on top. However, a light source at the center of a relatively large drum is unnecessarily far from the film. The arrangement illustrated in FIG. 6 removes this defect. Here, the light source 107 is positioned between the center of the drum and its periphery, and a plano convex lens 106 is so interposed between the light source and the surface of the drum with the flat side of the lens toward the source that the rays are refracted into paths that are radial with respect to the drum and therefore perpendicular to the original film 19 and the duplicating film 11.

Figure 7:
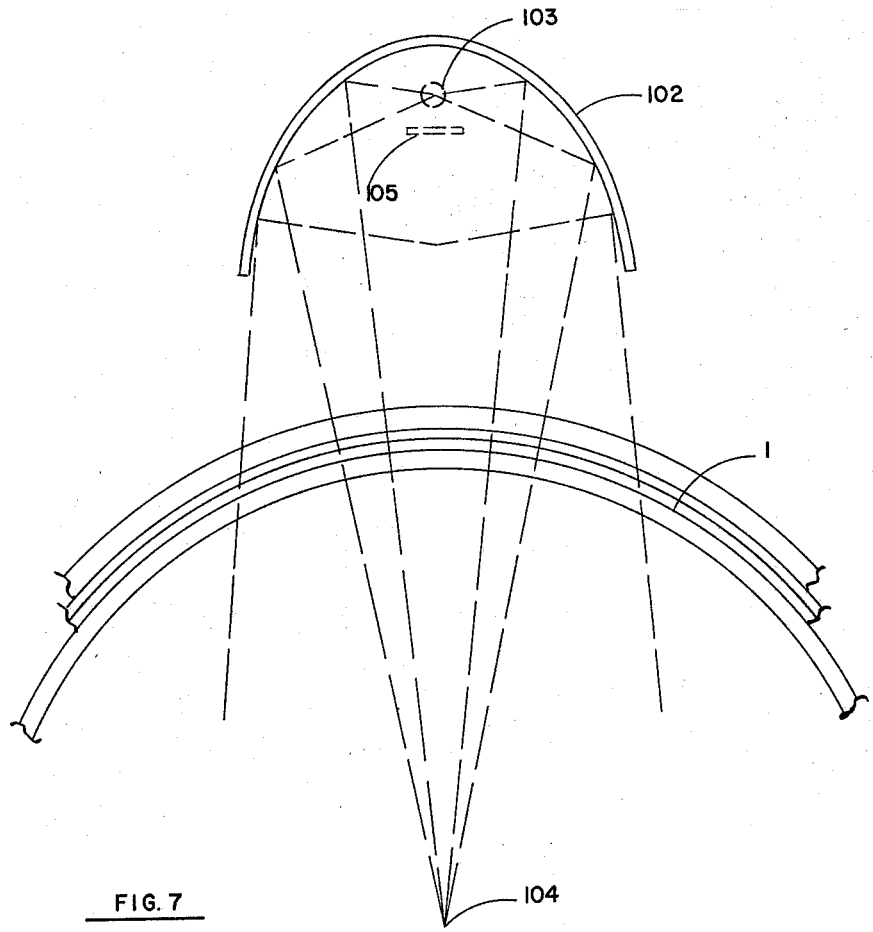
FIG. 7 illustrates a means employing a generally parabolic reflector for directing rays from an external source toward the rotational axis of the drum in radial lines.

FIG. 7 illustrates an arrangement in which a parabolic reflector 102 reflects the rays from a source 103 into paths that are radial with respect to the drum 1. In order to prevent the direct rays from source 103 from spreading out over the films, and to confine the light reaching them to the reflected rays that converge at the center 104 of the drum, a light shield 105 is placed between the source 103 and the films.

It will be obvious to those skilled in the art that various modifications may be made from the illustrative embodiments shown and described and that other elements may be substituted for those set forth herein providing the substituted elements perform the same functions as those in the appended claims. These elements may be changed in position, reversed or transposed—all without departing from the broad spirit of the invention as succinctly set forth in the appended claims.

The inventor claims:

1. In a machine for the duplication of film, a combination including: a rotatable printing drum; means for supplying original film and duplicating film in superimposed relationship to the periphery of said drum; a light source so disposed with relation to said films that light rays from said source will pass first through said original film and then through said duplicating film; and an optical system at least part of which is optically interposed between said light source and said original film so as to illuminate a substantial section of said original film, said system comprising means for so directing rays from said source that they will form a beam of non-parallel rays in which the individual rays move in lines that are substantially radial with respect to said drum at the locations where they impinge upon said original film.

2. In apparatus for the duplication of film, a combination including: a rotatable printing drum; means for supplying original film and duplicating film in superimposed relationship to the periphery of said drum; a light source; and an optical system at least part of which is optically interposed between said source and said original film, said system comprising means for so directing rays from said source that they will fall upon a substantial section of said original film as a beam of rays that are individually radial with respect to said drum at the locations where they impinge upon the film.

3. In apparatus for the duplication of film that may be reeled, a combination including: a rotatable printing drum; means for rotating said drum; means for supplying duplicating film to the periphery of said drum; means for superimposing original film over said duplicating film; a light source; and an optical system at least part of which is interposed between said source and said original film, said system comprising a pair of plano convex lenses so disposed that the rays passing therethrough from said source illuminate a substantial section of said original film and will individually be substantially radial with respect to said drum at the locations where they impinge upon said film.

4. In apparatus for the duplication of film that may be reeled, a combination including: a rotatable printing drum; means for rotating said drum; means for supplying duplicating film to the periphery of said drum, means for superimposing original film over said duplicating film; a light source; and a reflector of substantially parabolic cross-section so disposed with respect to said source that reflected rays therefrom will be reflected toward said original film, to illuminate a substantial section thereof, in paths that are radial with respect to said drum at the locations where they impinge upon said film.

5. In apparatus for the duplication of film that may be reeled, a combination including: a rotatable printing drum; means for rotating said drum; means for supplying duplicating film to the periphery of said drum; means for superimposing original film over said duplicating film; a light source; a reflector of substantially parabolic cross-section so disposed with respect to said source that reflected rays from said source will be reflected toward said original film, to illuminate a substantial section thereof, in paths that are radial with respect to said drum at the locations where they impinge upon said film, and a shield so interposed between said source and said films that the films will be shielded from the direct rays from said source.

6. In apparatus for the duplication of film, a combination including: a rotatable drum having a transparent peripheral wall; means for supplying original film and duplicating film to the periphery of said drum; a light source within said drum; and an optical system within said drum, said system comprising means for directing rays from said source to illuminate a substantial section of said original film such that said rays will diverge and follow paths that are substantially radial with respect to said drum at the locations where they impinge upon said film.

7. In apparatus for the duplication of film, a combination including: a rotatable drum having a transparent peripheral wall; means for supplying original and duplicating film to the periphery of said drum; a light source within said drum; and an optical system within said drum, said system comprising a plano-convex lens so interposed between said source and the periphery of said drum that the rays from said source passing through said lens will illuminate a substantial section of said original film and will follow paths that are radial with respect to said drum at the locations where they impinge upon said film.

8. In apparatus for the duplication of film that may be reeled, a combination including: a rotatable printing drum; means for rotating said drum; means for supplying duplicating film to the periphery of said drum; means for superimposing original film over said duplicating film; a plurality of light sources arcuately arranged around said drum; and a plurality of optical systems each individual to one of said sources, at least a part of each system being interposed between its associated light source and said original film, each of said systems comprising means for so directing rays from the associated source that said rays will fall upon a substantial section of said original film as a beam of rays, each of which rays is radial with respect to the drum at the location where it impinges upon said film.

9. In apparatus for the duplication of film that may be reeled, a combination including: a rotatable printing drum; means for rotating said drum; means for supplying duplicating film to the periphery of said drum; means for superimposing original film over said duplicating film; a light source; and an optical system comprising (a) a reflector so disposed with respect to said source that rays reflected therefrom will fall upon said original film and (b) at least one plano convex lens so interposed between said source and said original film that direct rays from said source and reflected rays from said reflector will illuminate a substantial section of the film and will be directed through said original film in paths that are substantially radial with respect to said drum at the locations where they impinge upon said film.

10. In apparatus for the duplication of film that may be reeled, a combination including: a rotatable printing drum; means for rotating said drum; means for supplying duplicating film to the periphery of said drum; means for superimposing original film over said duplicating film; a light source; and an optical system comprising (a) a reflector so disposed with respect to said source that rays reflected therefrom will fall upon said original film, (b) at least one plano-convex lens so interposed between said source and said original film that direct rays from said source and reflected rays from said reflector will be directed through said original film in paths that are substantially radial with respect to said drum and (c) a dichroic filter so interposed between said light source and said original film that some of the red and infrared rays from said source will be intercepted.

11. In apparatus for duplicating photographic film that may be reeled, a combination including: a rotatable printing drum; means for rotating said drum; a first rotation-resisting reel for supplying duplicating film to the periphery of said drum; a first wind-up reel for said duplicating film; a first driven stripping wheel operatively interposed between said printing drum and said first rewind reel, said first stripping wheel so disposed with respect to said drum and other components of the apparatus that duplicating film extending therearound enroute to said first wind-up reel will traverse at least half of said first stripping wheel; means for yieldingly rotating said first wind-up reel; a second rotation-resisting reel for supplying original film; means for so guiding said original film as it approaches said drum that it will be superimposed over the duplicating film thereon; a second wind-up reel for receiving said original film from said printing drum; a second driven stripping wheel so disposed with respect to said drum and other components of the apparatus that original film extending therearound enroute to said second wind-up reel will traverse at least half of said second stripping wheel; and means for yieldingly driving said second wind-up reel.

12. In apparatus for duplicating photographic film that may be reeled, a combination including: a rotatable printing drum; means for rotating said drum; a first rotation resisting reel for supplying duplicating film to the periphery of said drum; a first wind-up reel for said duplicating film; a first driven stripping wheel operatively interposed between said printing drum and said first rewind reel, a first idler roller so operatively disposed between said first stripping wheel and said first wind-up reel that duplicating film extending around said first stripping wheel will traverse at least half the periphery thereof; means for yieldingly rotating said first wind-up reel; a second rotation-resisting reel for supplying original film; means for so guiding said original film as it approaches said drum that it will be superimposed over the duplicating film thereon; a second wind-up reel for receiving said original film from said printing drum; a second driven stripping wheel operatively interposed between said drum and said second wind-up reel; a second idler roller so operatively interposed between said second stripping wheel and said second wind-up reel that original film extending around said second stripping wheel will traverse at least half the periphery thereof; and means for yieldingly driving said second wind-up reel.

13. In apparatus for duplicating photographic film that may be reeled, a combination including: a rotatable printing drum; means for rotating said drum; a first rotation resisting reel for supplying duplicating film to the periphery of said drum; a first wind-up reel for said duplicating film; a first driven stripping wheel operatively interposed between said printing drum and said first rewind reel, said first stripping wheel so disposed with respect to said drum and other components of the apparatus that duplicating film extending therearound enroute to said first wind-up reel will traverse at least half of said first stripping wheel; means for yieldingly rotating said first wind-up reel; a second rotation-resisting reel for supplying original film; means for so guiding said original film as it approaches said drum that it will be superimposed over the duplicating film thereon; a second wind-up reel for receiving said original film from said printing drum; a second driven stripping wheel so disposed with respect to said drum and other components of the apparatus that original film extending therearound enroute to said second wind-up reel will traverse at least half of said second stripping wheel; means for yieldingly driving said second wind-up reel; at least one light source; and an optical system at least part of which is interposed between said source and said original film, said system comprising means for so directing rays from said source that they will fall upon said original film as a beam of rays that are individually radial with respect to said drum.

References Cited

UNITED STATES PATENTS

| | | | |
|---|---|---|---|
| 2,091,280 | 8/1937 | Huebner | 355—117 X |
| 2,560,696 | 7/1951 | Huebner | 355—85 |

NORTON ANSHER, Primary Examiner

R. A. WINTERCORN, Assistant Examiner

U.S. Cl. X.R.

355—104, 117